Figure 4:
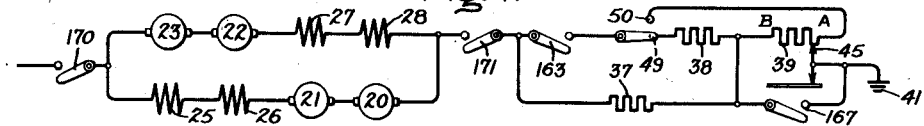
Figure 5:
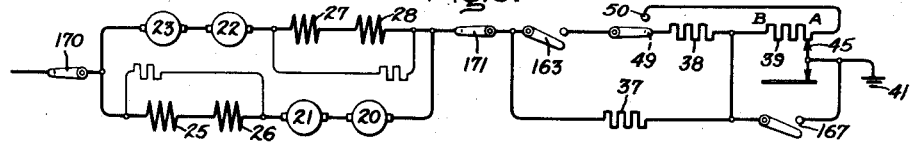

Sept. 8, 1942.                J. W. McNAIRY ET AL                2,295,285
                                CONTROL SYSTEM
                         Filed July 24, 1940           3 Sheets-Sheet 1
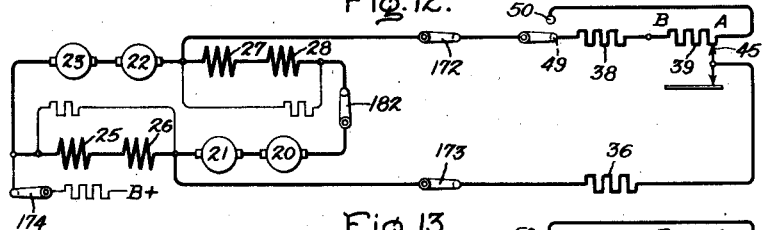
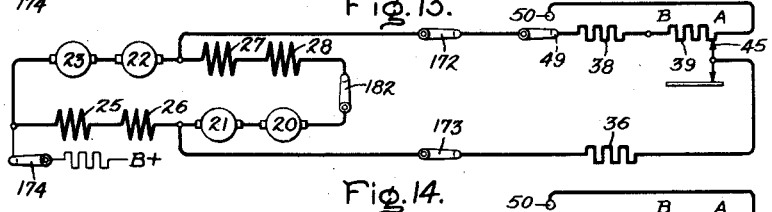
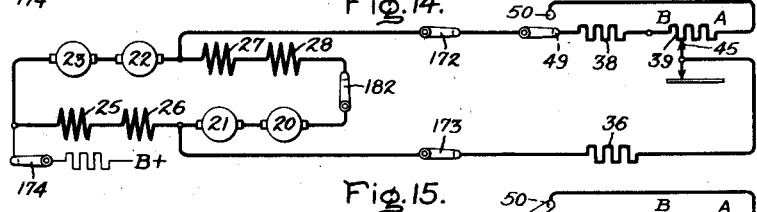
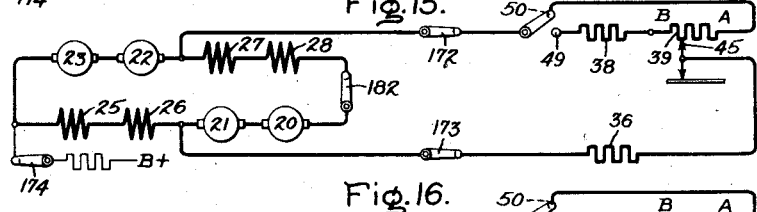
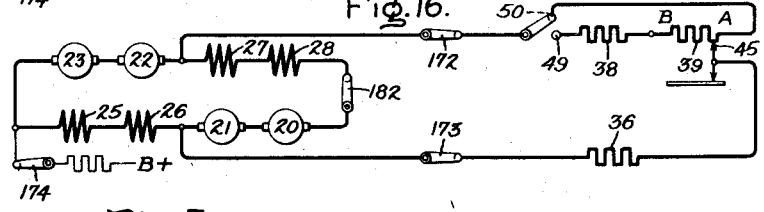
Fig.3.
| SEQUENCE TABLE | | | | | | | | KM BRUSH ARM AT |
|---|---|---|---|---|---|---|---|---|
| | LB1 | LB2 | C1 | TS1 | TS1&TS2 | B1,B2,B3 | FS1,FS2 | FS3,FS4 | |
| SWITCHING | ● | ● | ● | ● | | | ● | | A |
| | ● | ● | ● | ● | | | ● | ● | A |
| ACCELERATING | ● | ● | ● | ● | | | ● | | A+ |
| | ● | ● | ● | ● | | | | | A+ TO B |
| | ● | ● | ● | | ● | | | | B TO A+ |
| | ● | ● | ● | | ● | | ● | | A+ |
| | ● | ● | ● | | ● | | ● | ● | A |
| COASTING & BRAKING | | | | | ● | ● | ● | ○ | A TO B |
| | | | | | | ● | ● | ○ | B TO A |
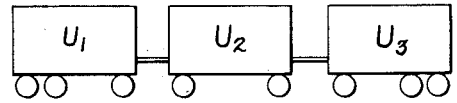
Fig.1.
Inventors:
Jacob W. McNairy,
Harold G. Moore,
by Harry E. Dunham
Their Attorney.

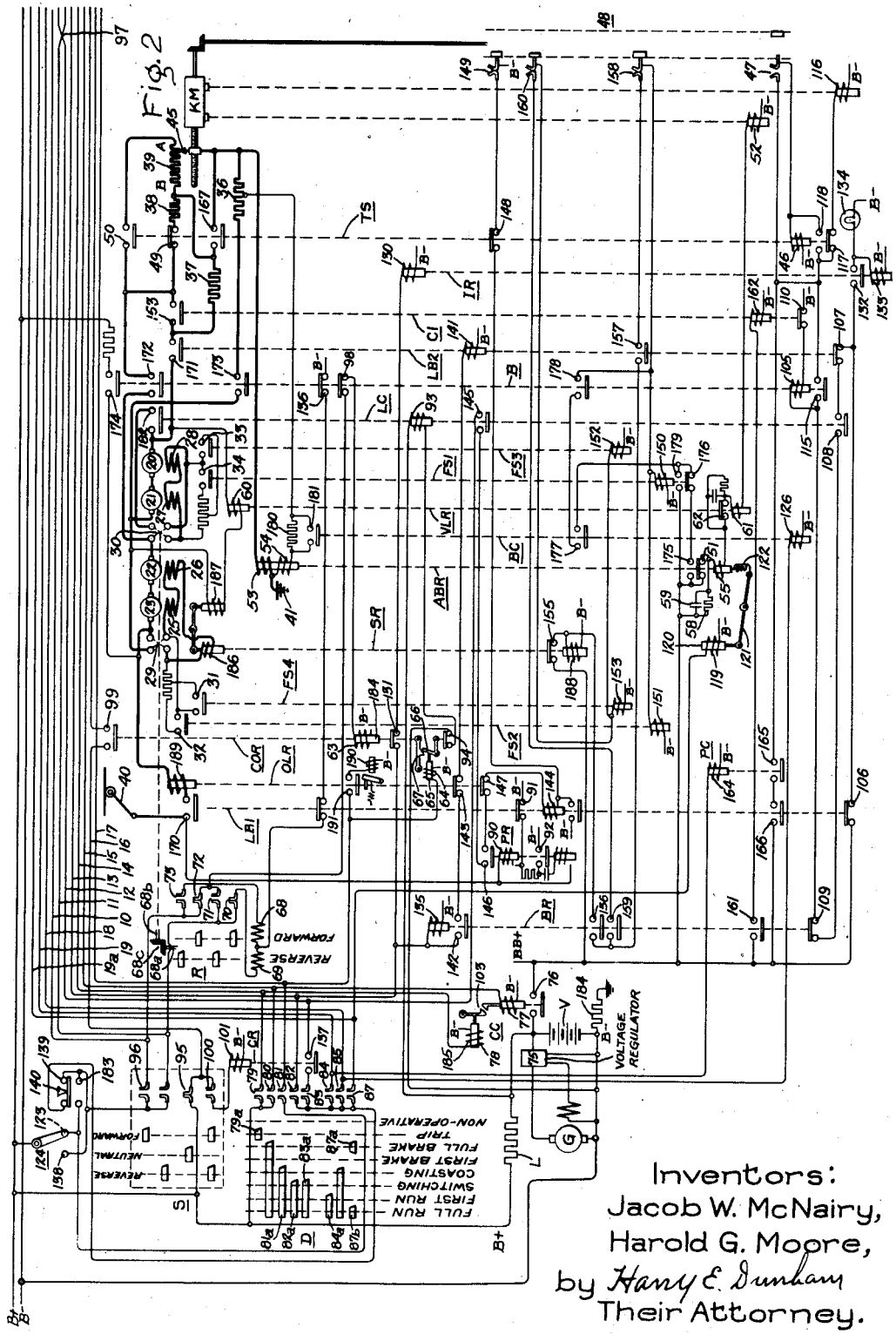

Sept. 8, 1942.     J. W. McNAIRY ET AL     2,295,285
CONTROL SYSTEM
Filed July 24, 1940     3 Sheets-Sheet 3

Inventors:
Jacob W. McNairy,
Harold G. Moore,
by Harry E. Dunham
Their Attorney.

Patented Sept. 8, 1942

2,295,285

UNITED STATES PATENT OFFICE 2,295,285

CONTROL SYSTEM

Jacob W. McNairy, Erie, and Harold G. Moore, Wesleyville, Pa., assignors to General Electric Company, a corporation of New York Application July 24, 1940, Serial No. 347,330

38 Claims. (Cl. 172—179)

Our invention relates to control systems for electric vehicles such as railway cars, elevators and the like, and more particularly to an acceleration and braking control system of general type described in Patents Nos. 2,120,954 to McNairy and 2,120,956 to Tritle, both of which are assigned to the same assignee as the present application.

While systems of the type described in the above mentioned patents are designed for service in connection with a single driving vehicle, our invention relates to the adaption of such a system to the driving of a multiple-unit articulated train. The application of such a system of automatic control to a multiple-unit vehicle introduces numerous problems arising from possible defective operation of one or more of the units. For example, if the two end cars of a multiple-unit train are provided with traction motors and related control, the train may be arranged to operate in either direction. In either direction of operation the head end car may be said to be operating in its forward direction while the rear-end unit will have to operate in its reverse direction. If automatic control is provided for connecting the rear-end unit for operation in the proper direction to assist the head end unit, it is conceivable that such reversing mechanism may fail in its operation. In our invention, therefore, means is provided for giving a readily apparent indication of whether or not the rear-end unit is prepared for operation in the proper direction.

In the control system disclosed in Patent No. 2,120,954 McNairy, above mentioned, all dynamic braking circuits are established during coasting. This is likewise true of the system to which our invention is applied. In a system such as this it is possible that, due to some failure in the control apparatus, the braking circuits of the rear-end car will be maintained when motoring is called for from the control station on the head-end car. The rear-end car will then be towed by the head-end car. If this condition were allowed to persist, large dynamic braking currents would be circulated through the traction motors of the rear-end car while it was being towed. To overcome this difficulty our invention provides simple and effective means for opening the braking circuits of a defective unit and maintaining them inoperative while the car is being towed.

A further problem introduced by the application of complete automatic control to a multi-unit train in which a storage battery is used as a source of supply for the control circuits is that the energy of the battery is subject to serious depletion if it is allowed to remain connected to the numerious circuits involved in multiple-unit operation while the train is not in use. To avoid this possibility we provide means whereby when the train is not in operation all multiple unit circuits are so connected that serious drain on the battery is prevented, while disconnection of the battery from all local circuits is assured.

An object of the invention, therefore, is to provide a multiple-unit, electrically-driven vehicle with a control system so arranged that all driving units may be simultaneously controlled from a single control station on a selected unit. A further object is to provide means for indicating defective operation of any unit, and means for operating temporarily with said defective unit disabled.

The novel features which we consider characteristic of our invention will be pointed out with particularity in the appended claims. For a better understanding of the invention itself, however, as well as for a further appreciation of the objects and advantages thereof, reference should be had to the accompanying drawings in which Fig. 1 is a diagrammatic illustration of a multiple-unit vehicle to which our invention may be applied; Fig. 2 is a simplified diagram of a single unit of a system of traction motor control embodying our invention; Fig. 3 is a sequence table for operation of the various contactors shown in Fig. 2; Figs. 4 to 11 inclusive are simplified circuit diagrams showing various stages in the accelerating sequence of the units; and Figs. 12 to 16 inclusive are simplified circuit diagrams showing various stages in the coasting and braking sequences of the units. Like reference numerals have been used for corresponding elements in the various figures.

Referring now to the drawings, and particularly to Figs. 1 and 2, the head-end unit U1 of Fig. 1 and the rear end-unit U3 of Fig. 1 are the driving units of the three-car train illustrated. Fig. 2 is a circuit diagram showing the traction motor circuits and control circuits on one of the driving units, for example, U1. It is to be understood that the rear end driving unit U3 is provided with traction motor circuits and control circuits connected in the same manner as those of Fig. 2, and that the control circuits of U1 and U3 are interconnected through the train wires B+ and 10 to 19a inclusive, as shown.

As shown in Fig. 2, the control system is illustrated as applied to a plurality of traction motors 20, 21, 22 and 23. Series field windings 25, 26, 27 and 28 are connected to the motor circuit through electro-magnetically operated reversing switches 29 and 30 respectively. Series windings 25 and 26 are arranged to be shunted by a circuit of variable resistance through the contacts 31 and 32, while the series field windings 27, 28 may be shunted by a circuit of variable resistance through the contacts 33 and 34. The traction motors are permanently connected in two series groups comprising the motors 20, 21 and the motors 22, 23 respectively and these series groups are permanently connected in parallel.

A plurality of motor controlling resistors 36, 37, 38 and 39 are provided for selectable connection in a common series circuit with the series-parallel motor group. The motors and their controlling resistances may be connected to one side of a direct current power line through a line circuit breaker LB1 and a trolley 40, and to the other side of the line through a line circuit breaker LB2 and a ground connection 41.

Before proceeding with a detailed description of the mode of operation, attention should be directed to a few of the principal elements of the control system. The motor KM is pneumatically operated to vary the position of a brush 45 along a variable resistance 39. This motor is of the type shown and described in Patent No. 2,120,954 to McNairy, mentioned above, and differs from the operating device 24 of that patent only insofar as the oil valve of the motor forming a part of our invention is provided with only a single operating solenoid and coil. Such a pneumatically operated motor having only a single oil valve coil is diagrammatically shown in Patent No. 2,185,861 to McNairy, assigned to the same assignee as the present application. A transfer switch TS is provided for cutting out the motor controlling resistance 38 and substituting therefor the variable resistance 39 during the course of the accelerating and breaking sequences. The switch TS has an operating coil 46 adapted to be energized through a contact 47 closed by a cam switch 48. Contacts 49 and 50 of transfer switch TS are simultaneously operated to remove the resistance 38 from the braking circuit and substitute therefor the resistance 39.

An accelerating and braking relay ABR is arranged to control through its contacts 51 the oil valve operating coil 52 of the motor KM. Relay ABR is of the vibrating type and is provided with a series operating coil 53, a shunt operating coil 54 and a regulating coil 55. The regulating coil 55 assists the operating coils in picking up the relay ABR. When the relay has been picked up the regulating coil 55 is deenergized by the contacts 51 of the relay and the operating force acting upon the relay armature is thereby diminished to such an extent that the relay immediately drops out. Since the contacts 51 also open the circuit of the oil valve operating coil 52 of motor KM, it will be seen that the effect of the operation of the relay ABR upon the motor KM is that the operating speed of the motor, as determined by the size of the oil-restricting orifice, is under the control of the relay ABR. Contacts 51 of this relay are shunted by a resistance 58 and a capacitance 59 in parallel in order to avoid arcing at the contacts when the relay is operated.

A voltage limit relay VLR is somewhat similar to relay ABR. The relay VLR is also of the vibrating type and provided with an operating coil 60 connected across the motors 20 and 21, a regulating coil 61, and a contact 62. The coil 61 and the contact 62 of VLR are connected in series with the coil 55 and the contact 54 of ABR, and all these elements are in series with the oil valve operating coil 52 of the motor KM. It will therefore be apparent that either the relay ABR or the relay VLR may independently control the oil valve of motor KM so long as the other one of these relays is not operating at the time.

A cutout relay COR provides an essential link in the interconnection of the control circuits of the separate driving units. The relay COR is provided with a trip coil 63 and a latch coil 64. Only the trip coil of this relay is operated in the course of an normal operating sequence, and therefore in normal operation the relay COR does not latch in after energization. The latch coil 64 of relay COR is provided with an armature 65 which, upon operation, is latched into position by latching members 66 and 67. In latching itself under the latch 67 the member 66 raises the latch member 67 and the connected armature of the trip coil 63 so that the armature of the trip coil is likewise latched in its operated position. A sufficient clearance is provided so that upon subsequent energization of the trip coil the latch member 67 is raised to release the member 66 and the armature 65.

An electromagentically operated rotatable drum R is arranged to operate the field reversing switches 29, 30 through shafts 68a and 68b and gears 68c. The elements R, 29 and 30 constitute a reverser for the traction motors. The drum R has only two positions, namely "forward" and "reverse," and is provided with electromagnetic coils 68 and 69 for throwing the drum into these two positions respectively. The drum R operates a plurality of cam switches 70, 71, 72 and 73 which control the circuits of the coils 68 and 69 and the circuit for the trip coil 63 of the relay COR. The cam switches 70 and 72 are shown closed in Fig. 2, as in the "forward" position of R.

All the control circuits are supplied with power from a storage battery V connected to a charging generator G through a conventional voltage regulator and reverse current cutout 75. Two main control voltage supply lines are supplied from the battery. Control voltage supply line B+ is connected to the positive side of the battery through a load-limiting resistor L and control voltage line B— is connected to the negative side of the battery. Lines B+ and B— are common to all units of the multi-unit vehicle. A local power supply line BB+ is connected to the positive side of the battery through contacts 76 of a control contactor CC. The control contactor CC is a latching contactor provided with an operating coil 77 and a tripping coil 78. The line B— is grounded through a resistor 184.

A manually operated controller D and a selector switch S are arranged on each unit selectively to control the operating sequence of the entire system. The selector switch S, having "neutral," "forward" and "reverse" positions, is used to select a desired direction of operation for the vehicle. A main controller D is provided with a plurality of cam switches 79, 80, 81, 82, 83, 84, 85, 86 and 87 by means of which the control system is carried through its various operating sequences. The manually operated selector S and the main controller D are independently operated. The selectors S are operated by a removable handle which is carried between cars by the operator and may be removed from any selector only when that selector is in the neutral position.

It is believed that a complete understanding of the invention may best be had from a description of the mode of operation of the system as a whole.

For the purpose of completeness and clarity the operation of the system will be carried through from the "non-operative" position of the controller D, through a normal accelerating sequence, and back through a normal coasting and braking sequence to return to the "non-operative" position. In order to more clearly point out the invention, the normal operation of the system through its accelerating coasting and braking sequences will first be described, and specific improved features of the system will be described with greater particularity thereafter.

*Acceleration*

At the beginning of the accelerating cycle the master controller D is in its "non-operative" position and it will be assumed that the battery charging generator G is in operation and that pneumatic pressure is available for operation of the pneumatic devices. Under these conditions it will be apparent that the operating coil 90 of the potential relay PR is energized from the trolley 40 through the normally closed contacts 91 of line breaker LB1. The relay PR is therefore picked up and is locked in through its holding contacts 92. The operating coil 93 of the loop contactor LC is also energized through the normally closed contacts 94 of the cutout relay COR. The contactor LC is therefore maintained in its picked up position. The first step of the operation is carried out by choosing a direction of operation my means of the selector S at the chosen control station. The selector S is shown in Fig. 2 in its neutral position with the cam switch 95 closed. It will be assumed that the switch S has been placed in its "forward" position. Since only one operating handle is provided for the various selectors, all selectors other than that at the chosen control station will now ordinarily be locked in their neutral positions. It will now be observed that the control wire 10 is energized from the control wire B+ through the contact 138 of a manual control switch 124 and a cam switch 96. The drum R is shown in Fig. 2 in its "forward" position with the cam switches 70 and 72 closed. Therefore neither the coil 68 nor the coil 69 is energized. Had the drum R been in its "reversed" position its cam switch 73 would have been closed to energize the coil 68 from the wire 10. The energization of the coil 68 would operate the drum R and throw it to its "forward" position. The control wires 10 and 11 are reversed at 97, so that the drum R on the rear car will assume its "reverse" position. With the drum R in its "forward" position its cam switch 72 is closed with the result that the operating coil 63 of the cutout relay COR is energized through the normally closed switch 98 of contactor B. The operating coil of the cutout relay COR on the rear car U3 is energized through the cam switch 96 and the wire 10 of the head-end car U1, the wire 11 of the rear car, and the cam switch 71 of the reverser R on the rear car. The contacts 99 of COR establish an energizing circuit for the control relay CR. This circuit may be traced from the wire B+, through the cam switch 95 of selector S in the rear car U3, through the wire 16, the contacts 99 of the relays COR of both rear and head end cars, the cam switch 100 of selector S of the head end car U1, and the coil 101 of the head end control relay CR, to the wire B—. The master controller D may now be moved through its "trip" position to its "full brake" position. With the controller D in "full brake" position, the cam switch 80 will be closed and power applied to the control wire 15. Control wire 15 energizes the operating coil 77 of the control contactor CC and this contactor picks up to close its contact 76. A latch 103 maintains the contactor CC in its operated position in the event that energization is removed from the coil 77. Through the contact 76 of contactor CC the local control bus BB+ is connected to the positive side of the battery. As soon as power is applied to the wire BB+ an energizing circuit is established for the oil valve operating coil 52 of the motor KM. This circuit may be followed from the control wire BB+ through the contacts 51 and the coil 55 of the relay ABR, the contacts 62 and the coil 61 of the relay VLR, and the coil 52 to the wire B—. When the coil 52 is energized its armature picks up to open the oil restricting orifice of motor KM. With the application of power to the control wire BB+ energization is also supplied to the operating coil 105 of contactor B. This circuit may be traced from the control wire BB+ through the contact 106 of LB1, the contact 107 of LB2, the contact 108 of LC, the contact 109 of braking relay BR, the coil 105 of contactor B and the contact 110 of contactor C1 to the wire B—. Upon operation, the contactor B opens its contacts 98 and thereby breaks the energizing circuit of the trip coil 63 of the relay COR. When the relay COR drops out it opens its contacts 99 to deenergize the coil 101 of relay CR. Relay CR then drops out. Contactor B also closes its contacts 115 to complete a circuit for the air valve operating coil 116 of the motor KM. This circuit may be traced from the wire BB+ through the contacts 106 of LB1, the contacts 107 of LB2, the contacts 108 of LC, the contacts 109 of BR, the contacts 115 of B, the contacts 117 of transfer switch TS, and the coil 116 to the wire B—. The energization of the coil 116 sets motor KM in operation to move the brush 45 from its position A towards its position B. During its operation the motor KM also operates the cam switch 48. Cam switch 48 is so arranged that when the brush 45 reaches its position B the cam switch operates to close its contact 47. Closure of the contact 47 completes an energizing circuit for the operating coil 46 of the switch TS. This circuit may be followed from the wire BB+ through the contacts 106 of LB1, the contacts 107 of LB2, the contacts 108 of LC, the contacts 109 of BR, the contacts 115 of B, the contacts 47 of the cam switch 48 and the coil 46 to the wire B—. Upon operation of the switch TS it closes a holding contact 118 to shunt the contact 47 of cam switch 48 and thus lock itself in. Operation of the switch TS also results in the opening of its contact 117 to break the circuit of the air valve operating coil 116 of the motor KM. It will be apparent from reference to Patent No. 2,012,954 McNairy, mentioned above, that deenergization of the air valve operating coil 116 results in the reversal of motor KM. The brush 45 therefore moves from its position B to its position A.

In the "full brake" position of the controller D the cam switch 87 is closed by the cam 87a to energize the coil 119 of a rate controlling relay 120. Relay 120 operates through a lever arm 121 to vary the tension upon an armature restraining spring 122 of relay ABR. The purpose of this change in the setting of relay ABR will be further explained in connection with the sequence of our control system. The sequence described above has established the dynamic braking circuits with the car stationary. The purpose of thus establishing the braking circuits is to insure that these circuits are established whenever the controller D is moved from any operating position to its "non-operative" position.

If controller D is now moved to its "first brake" position the cam switch 87 is opened by cam 87a to deenergize the relay 120. No other changes in the electrical circuits occur in moving from "full brake" to "first brake" position of controller D.

Continuing with the accelerating cycle, the controller D may now be moved to its "coasting" position. In this position of the controller the came 81a closes the contacts of its cooperating cam switch 81 in the control wire 17. The closing of the contacts 81, however, produces no change in the electrical connections because the control wire 17 has been deenergized at the contact 123 of the control switch 124. It will also be noted that in "coasting" position the operating coil 126 of contactor BC is energized through the cam switch 85. The effect of the operation of the contactor BC will be further described hereinafter.

If the controller D is now moved to its "switching" position, the cam switches 82 and 83 are closed by the cams 82a and 83a to energize the control wires 13 and 12 respectively. From the control wire 13 an energizing circuit for the operating coil 130 of the indicating relay IR is completed through the normally closed contacts 131 of relay COR. The indicating relay IR therefore picks up and its contact 132 is closed to complete a circuit for its holding coil 133 as well as for the "bad order" indicating lamp 134. The circuit for the coil 133 and the lamp 134 may be traced from the control wire BB+ through the contact 106 of LB1, the contact 132 of IR and the coil 133 and the lamp 134 in parallel to the wire B—. Through the control wire 13 energization is supplied to the operating coil 135 of the braking relay BR. The relay BR therefore picks up and opens its contact 109 to break the energizing circuit of the operating coil 46 of the switch TS and the energizing circuit of the operating coil 105 of the contactor B. When the contactor B drops out it closes its contacts 98 and 136. In closing, the contact 98 again completes an energizing circuit for the trip coil 63 of the cutout relay COR. When the relay COR operates it opens at its contact 131 the circuit of the operating coil 130 of the indicating relay IR. The relay IR does not, however, drop out at this time since its holding coil 133 remains energized. By its operation the relay COR also closes its contact 99 to connect the control wire 16 to the rear-end car. Through the control wire 16 and a circuit which has previously been traced an energizing circuit is again completed for the control relay CR. The control relay CR therefore picks up and closes its contacts 137 to connect the control wire 12 to the wire B+. This circuit may be traced from the wire B+ through the contact 138 of the control switch 124, the contact 139 of the overload reset switch 140, the cam switch 83 of the controller D and the contact 137 of the relay CR. Since the relay BR has been operated, an energizing circuit is now complete for the operating coil 141 of the line breaker LB2. This circuit may be traced from the control wire 13 through the contact 142 of the relay BR, the contact 143 of the overload relay OLR and the coil 141 to the wire B—. Through the control wire 12 an energizing circuit is completed for the operating coil 144 of the line breaker LB1. This circuit may be followed from the control wire 12 through the contact 145 of the contactor LC, the contact 146 of the potential relay PR, the contact 147 of the overload relay OLR, the coil 144, the contact 148 of switch TS and the contact 149 of the cam switch 48 to the wire B—. As soon as the line breaker LB1 picks up it opens its contact 106 to break the energizing circuit for holding coil 133 of relay IR. Relay IR therefore drops out and light 134 is also deenergized. With the relay BR and the line breakers LB1 and LB2 now closed, circuits are completed for the operating coils 150, 151, 152 and 153 of the field switches FS1, FS2, FS3 and FS4 respectively. The switches FS1 and FS2 are connected in parallel across the control line, and the energizing circuit for the operating coils of these switches may be traced from the control wire BB+ through the contact 155 of the speed relay SR, the contact 156 of the relay BR, the contact 157 of the line breaker LB2, the contact 158 of the cam switch 48, and in parallel through the coils 150 and 151 of the switches FS1 and FS2 respectively to the wire B—. The field switches FS3 and FS4 are likewise energized in parallel and the energizing circuit of the operating coils of these switches may be followed from the control wire BB+ through the contact 155 of the relay SR, the contacts 156 and 159 of the relay BR, the contact 160 of the cam switch 48, and in parallel through the coils 152 and 153 of the switches FS3 and FS4 respectively to the wire B—.

With the master controller D in the "switching" position another operating circuit is prepared by the relay BR. This circuit is completed through the contact 161 of the relay BR to energize the coil 162 of the contactor C1. Contactor C1 therefore picks up and closes its contact 163 in the driving motor circuit. Closure of the contact 163 places the fixed starting resistors 37 and 38 in parallel.

Figure 6:
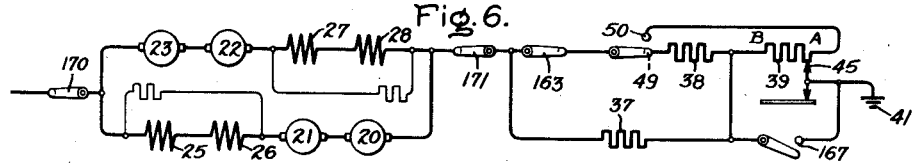
Figure 7:
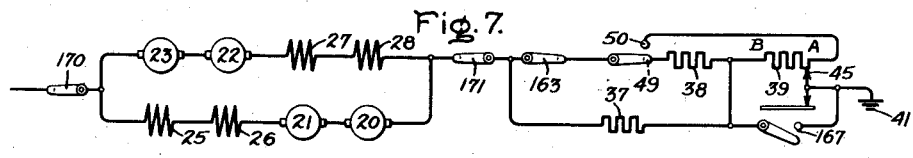
Figure 8:
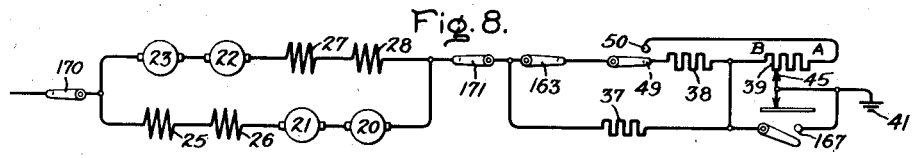
Figure 9:
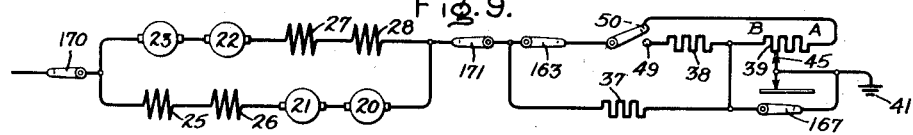
Figure 10:
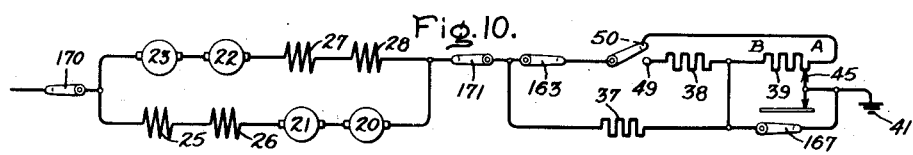

Proceeding with the accelerating cycle, the master controller D is moved to its "first run" position. In this position the cam 84a closes its cooperating cam switch 84 to complete a circuit for the operating coil 164 of the contactor PC. The contactor PC is therefore operated and closes its contact 165 to complete an energizing circuit for the air valve operating coil 116 of the motor KM. This energizing circuit may be traced from the wire BB+ through the contact 166 of LB1, the contact 165 of PC, the contact 117 of the switch TS and the coil 116 to the wire B—. As previously described, the motor KM now begins to operate in the direction to move the brush 45 from point A toward point B. Operation of the motor KM is permitted since the oil valve operating coil 52 was energized as soon as power was applied to the wire BB+. Upon energization, the coil 52 operated its armature to open the oil-restriction orifice of the motor KM. The connections of the power circuit as the motor KM begins its operation are shown in Fig. 6. It will be noted from Fig. 6 that the motor fields are shunted and that the contacts 49 and 50 of the switch TS are in their deenergized positions. As the brush 45 leaves point A of the resistor 39, the cam switch 48 opens its contact 160 to deenergize the operating coils 152 and 153 of the switches FS3 and FS4 respectively. Deenergization of the switches FS3 and FS4 results in the opening of their respective contacts 33 and 31 to partially unshunt the field circuits of the driving motors. As the operation of the motor KM proceeds, the cam switch 48 opens its contacts 158 to deenergize the operating coils 150 and 151 of the switches FS1 and FS2 respectively. Deenergization of these switches results in the opening of their respective contacts 34 and 32 completely to remove the shunts from the motor fields. At this point in the operation the condition of the power circuit is such as is diagrammatically represented by Fig. 7. From this point the motor KM continues to move the brush 45 toward point B gradually to remove the resistance 39 from the motor circuit. When the brush 45 arrives at position B the power circuit is in a condition represented by Fig. 8. In this position of the brush 45 and the motor KM the cam switch 48 causes the closure of its contact 47. The closure of the contact 47 completes an energizing circuit for the operating coil 46 of the transfer switch TS. This circuit may be traced from the wire BB+ through the contact 166 of LB1, the contact 165 of PC, the contact 47 of the cam switch 48 and the coil 46 to the wire B—. M picking up, the switch TS closes a holding circuit for itself through its contact 118. When the switch TS picks up it also opens its contact 49 and closes its contacts 50 and 167. Operation of these contacts of the switch TS results in removing the resistance 38 from the motor circuit and substituting therefor the resistance 39 which was previously removed from the circuit by the brush 45. The condition of the power circuit may now be represented by Fig. 9 of the drawings. As a further result of the operation of the switch TS the energizing circuit for the air valve operating coil 116 of the motor KM is broken at the contact 117 of the switch TS. As has been previously pointed out, deenergization of the coil 116 results in a reversal of the direction of operation of the motor KM. In returning to position A the brush 45 again gradually removes the variable resistance 39 from the starting circuit, and also short-circuits the resistance 37. Shortly before the brush 45 arrives at position A the condition of the power circuit may be represented by Fig. 10 of the drawings. As the brush 45 approaches position A the motor KM, through the cam switch 48, successively closes its contacts 158 and 160. Closure of the contacts 158 and 160 results in the energization of the field switches FS1, FS2, FS3 and FS4 through circuits which have previously been traced. Closure of the switches FS1, FS2, FS3 and FS4 serves to shunt the fields 25, 26, 27 and 28 of motors 23, 22, 21 and 20 in two steps. The shunting of the field circuits of the motors at the end of the accelerating cycle in this manner serves to increase the operating speed of the motors. The connections of the power circuits may now be represented by Fig. 11.

During that portion of the accelerating cycle just described in which the master controller D is on its "first run" position a predetermined rate of acceleration is maintained by the accelerating and braking relay ABR. The relay ABR itself has already been described and its mode of operation will now be explained. When in the course of the accelerating cycle of the motors the motor current reaches a predetermined value the series coil 53 of ABR, with the assistance of the regulating coil 55 picks up the relay to open its contacts 51, the opening of the contacts 51 causes the deenergization of the oil valve operating coil 52 of the motor KM and at the same time removes energization from the regulating coil 55 of ABR. Deenergization of the coil 52 and consequent dropping out of its associated armature results in closure of the oil-restricting orifice in the motor KM and consequently a substantial cessation of operation of the motor KM. Deenergization of the coil 55 of ABR causes the relay ABR to drop out since its series coil 53 alone does not supply sufficient magnetomotive force to maintain the relay operated. It will be apparent that this vibrating type of operation of the relay ABR maintains constant the current through the motors and thereby maintains a constant rate of acceleration.

If the master controller D is now moved to its full run position the only change produced in the control circuit is in the setting of the relay ABR. The "second run" position of controller D is used alternatively with the "first run" position to select a second predetermined rate of acceleration under the control of the relay ABR. In moving from the "first run" to the "second run" positions, the controller D, through the cam 87b and the cam switch 87, alters the tension of the restraining spring 122 of the relay ABR in a manner similar to that described above with reference to the cam 87a. By thus changing the setting of relay ABR the predetermined accelerating current maintained by ABR is altered.

*Coasting*

In beginning the decelerating cycle the controller D is turned first to the "coasting" position. In this position of the controller all dynamic braking circuits are established with the motor fields shunted. At this time the dynamic braking current is maintained at a very low value and is used only for spotting purposes. Tracing the circuits established in the "coasting" position, it will first be observed that the contactor PC has been deenergized through the opening of the cam switch 84 on the master controller D. Deenergization of the contactor PC causes the opening of its contacts 165 to break the circuit of the operating coil 46 of the transfer switch TS. The switch TS thereupon drops out, closing its contacts 49 and opening its contacts 50 and 167. This operation of the contacts 49, 50 and 167 places the resistors 38, 39 and 36 in series to prepare a dynamic braking circuit. In the "coasting" position of the controller D the control wires 12 and 13 are also deenergized at the cam switches 83 and 82 respectively. The deenergization of the control wire 12 opens the energizing circuit through the operating coil 144 of line breaker LB1, whereupon this line breaker drops out and disconnects the motors from the trolley 40 at the contact 170 of LB1. Removal of energization from the control wire 13 results in the deenergization of the operating coil 135 of the braking relay BR and also of the operating coil 141 of the line breaker LB2. Line breaker LB2 disconnects the motor circuit from ground connection 41 at the contact 171. In dropping out the relay BR also opens its contacts 161 to deenergize the operating coil 162 of contactor C1. The contactor C1 now drops out and opens its contact 163 in the motor circuit. The relay BR also opens its contacts 156 and 159 with the result that the circuits of the operating coils 150, 151, 152, and 153 of the field switches FS1, FS2, FS3 and FS4, respectively, are deenergized. The field switches therefor drop out and open their contacts 31, 32, 33, and 34 to remove the shunts from the motor fields. Since the relay BR and the contactor C1 are now in their deenergized positions, an operating circuit for the coil 105 of the contactor B is established. This circuit may be traced from the control wire BB+ through the contacts 106 of LB1, the contacts 107 of LB2, the contacts 108 of LC, the contacts 109 of BR, the coil 105 and the contacts 110 of the contactor C1 to the wire B—. The contactor B now picks up and in so doing closes its contacts 172 and 173 to complete the establishment of the dynamic braking circuit for the motors. The operation of the braking contactor B connects the traction motors so that, driven by the momentum of the cars, they will act as series generators. Current generated in the armatures of motors 22 and 23 flows through the fields of motors 20 and 21, while the fields of motors 22 and 23 carry the current generated in the armatures of motors 20 and 21. Contactor B also closes its contacts 174 to complete a field flashing circuit for the fields 26 and 25 of the motors 22 and 23. This latter circuit insures that the motors will quickly build up in the proper direction as generators. As has been noted, movement of the master controller to its "coasting" position caused the deenergization of the switch TS. In dropping out, the switch TS closed its contacts 117 to complete a circuit through the coil 116 of the air-operating valve of the motor KM. This circuit may be followed from the control wire BB+ through the contacts 106 of LB1, the contacts 107 of LB2, the contacts 108 of LC, the contacts 109 of the relay BR, the contacts 115 of B, the contacts 117 of TS and the coil 116 to the wire B—. As previously described, energization of the coil 116 enables the motor KM to begin operation to move the brush 45 from its position A toward its position B.

As brush 45 begins to leave its A position the relay ABR comes into operation. During "coasting" and "braking" the controlling relay ABR has a slightly different operation than during acceleration. During the accelerating cycle the shunt coil 54 of relay ABR was not operative. During the "coasting" and "braking" sequences the series coil 53 is inoperative and the shunt coil 54 acts with the regulating coil 55 to operate the relay.

Shunt coil 54 of ABR is connected across part of braking resistance 36, and is therefore responsive to the dynamic braking current. As soon as the motors begin to build up as generators, and at a very low value of generated current, the voltage applied to the shunt coil 54 of ABR is sufficient to operate the relay. As previously described, operation of ABR checks the speed of the motor KM and, in fact, brings it substantially to standstill. As soon as ABR picks up under the influence of its shunt coil 54 a circuit is completed through the contacts 175 of ABR for energizing the coils 150 and 151 of the switches FS1 and FS2, respectively. This circuit may be traced from the line BB+ through the contacts 175 of ABR, the contacts 176 of FS1, the contacts 177 of BC, the contacts 178 of B, and the coil 150 of switch FS1 to the wire B—, and in parallel from the contacts 178 through the coil 151 of the switch FS2 to the wire B—. When FS1 closes it completes, through its contacts 179, a holding circuit for itself and FS2. Therefore, only a momentary closure of ABR is sufficient to shunt the motor fields. The coasting circuit is now completely established and is diagrammatically illustrated at Fig. 12. Under these conditions the motors generate only a very small current because the relay ABR is set to operate at a very low value. The low operating point of the relay ABR results from the circuiting of a ballast resistor 180 by contacts 181 of the contactor BC. As previously pointed out, the relay ABR prevents the motor KM from moving the brush 45 beyond the position corresponding to the predetermined small coasting current. The small coasting current has no appreciable braking effect upon the vehicle.

*Braking*

The movement of the controller D from "coasting" to "first brake" results only in deenergization of the operating coil 126 of the braking contactor BC. When the braking contactor BC drops out it opens its contact 181 to insert the ballast resistor 180 in series with the shunt coil 54 of the braking relay ABR. Insertion of the resistance 180 increases the current response setting of the relay ABR. Relay ABR therefore drops out and, through the coil 52 opens the oil valve of the motor KM. Motor KM therefore proceeds in its forward operation. Continued operation of the motor KM again moves the brush 45 to continue the gradual removal of the resistor 39 from the braking circuit. In dropping out the contactor BC also opens its contact 177 to deenergize the operating coils 150 and 151 of the field switches FS1 and FS2. Dropping out of the field switches removes the shunt circuits from the motor fields, and this constitutes the first step in the braking sequence of the motors. This condition of the power circuit is represented in Fig. 13. When the brush 45 arrives in position B the dynamic braking circuit may be diagrammatically represented as at Fig. 14. When the motor KM has thus completed its operation to point B it has operated the cam switch 48 to close the contact 47 completing an energizing circuit for the operating coil 46 of the transfer switch TS. This circuit has already been traced and will be readily apparent. As already described with reference to the accelerating cycle, the operation of the transfer switch TS removes the resistance 38 from the motor circuit and substitutes therefor the variable resistance 39 in preparation for the second gradual removal of the resistance 39. This condition of the braking circuit is illustrated in Fig. 15. In the manner already described the switch TS has opened the circuit of the air valve operating coil 116 of the motor KM by the opening of the contacts 117 of the switch TS. Motor KM therefore begins its operation in the opposite direction to move the brush 45 from position B toward position A. The variable resistance 39 is thus removed from the braking circuit for a second time. The condition of the dynamic braking circuit may now be diagrammatically illustrated as in Fig. 16.

If the master controller D is further moved from "first brake" to "full brake" the tension on the restraining spring 122 of the relay ABR is increased through operation of the cam switch 81a and the relay 120, as previously described. This further changes the setting of the relay ABR. It will thus be observed that the only difference between the "first brake" and "full brake" positions of master controller D is that the current setting of the braking relay ABR is changed. These positions of the controller D are used alternatively to select a desired rate of acceleration.

During the "braking" sequence the voltage limit relay VLR controls the rate of deceleration jointly with ABR. As previously described, the relay VLR is responsive to the voltage across motors 20 and 21 and has a mode of operation similar to that of the relay ABR. The contacts 62 and the regulating coil 61 of VLR are in a series circuit with the contacts 51 and the regulating coil 55 of ABR and operating coil 52 for the oil valve of the motor KM. As a result of this connection the voltage limit relay VLR, through its operating coil 60, takes complete control of the rate of deceleration so long as the voltage across the motors 10 and 11 is above a predetermined value. During this portion of the accelerating cycle the current is not sufficiently high to operate the relay ABR and deceleration is therefore controlled in a manner such that the voltage of the dynamic braking circuit is maintained constant. As the speed of the vehicle decreases the voltage generated in the dynamic braking circuit can no longer be maintained at the operating point of the relay VLR. But due to the diminution of the amount of series resistance, a value of current sufficient to operate ABR is attained. When the voltage has decreased below the operating point of VLR the current will have increased above the operating point of ABR so that relay ABR will take over the control of the decelerating cycle to maintain a constant braking current.

Defective operation

An indicating relay IR and a "bad order" lamp 134 are provided to give an indication if the field circuits of any traction motor are not properly connected for operation of that motor in the chosen direction, or if contractor B of any unit does not properly open when desired. Referring back to the accelerating sequence described above, it will be recalled that when the master controller D is on its "switching" position and before the cutout relay COR picks up, an energizing circuit for the operating coil 130 of indicating relay IR is established through the contacts 131 of COR. The relay IR therefore picks up and is held in operated position through its holding coil 133 and its contact 132. "Bad order" lamp 134 is energized through the contacts 132. If the accelerating sequence proceeds in normal order the relay COR will be picked up to break the circuit for the operating coil 130 of the relay IR. IR does not, however, drop out at this time, since its holding coil 133 is still energized. As the accelerating sequence proceeds, however, the line breaker LB1 will be picked up and will open its contacts 106 to break the circuit for the holding coil 133 of IR and for the "bad order" lamp 134. It will therefore be seen that in the normal accelerating sequence the "bad order" lamp 134 is temporarily lighted before the vehicle is set in motion. In the event that the drum R of any driving unit is not thrown into the correct position the cutout relay COR of that unit will be disabled. For example, in Fig. 2, if the unit there shown is connected for "forward" operation by throwing the selector switch S to that position, energization will be applied to the control wire 10. If the reverser drum R is at this time in its "reversed" position and is not properly thrown into its forward position by coil 68, its cam switch 72 connected to wire 10 will be open. The energizing circuit for the coil 63 of the relay COR will therefore be disabled at the cam switch 72. Since the relay COR cannot now pick up the relay CR and the breaker LB1 cannot operate. The holding coil 133, the relay IR and the "bad order" lamp 134 will therefore not be deenergized. It will also be noted that the lamp 134 gives an indication in the event that the contactor B does not properly drop out. The energizing circuit for the coil 63 of the relay COR passes through the normally closed contacts 98 of the contactor B. Therefore if B fails to drop out in proper sequence, COR cannot pick up. Consequently the contacts 99 of COR fail to energize the relay CR, and the relay CR fails to energize the line breaker LB1 through the contacts 137. If the line breaker LB1 does not operate, the lamp 134 remains energized through the contacts 106 of LB1.

Our invention provides further protection by the operation of the loop contactor LC and the reset button 140. In the event any reverser drum R fails to throw to proper position, or the dynamic braking circuits of any unit remain established when motoring is called for, a contact 182 of the loop contactor LC is provided for disabling the braking circuits of the defective unit. It will be recalled that the contactor LC ordinarily remains energized during all control sequences due to the connection of its operating coil 93 directly across the generator G. The connection of the coil 93 across the generator, however, is completed through a contact 94 operated by the latching armature 65 and latching coil 64 of the cutout relay COR. If at any time it is necessary to disable the dynamic braking circuit, it is merely necessary to momentarily depress the reset button 140 with the master controller D in its "coasting" or any running position. This connects the wire 17 to B+ through the contacts 183 of the reset button and the cam switch 81 of the controller D. An energizing circuit is thus completed for the latch coil 64 of the cutout relay COR. As has been already described, the latching armature 65 will pick up and latch itself in operated position, while at the same time forcing the tripping armature 184 and its connected contact 131 of the relay COR into operated position. The contact 94 of relay COR is thus opened to deenergize the operating coil 93 of the contactor LC. When the contactor LC drops out it opens its contact 182 to disable the dynamic braking circuit, as may be observed by reference to Figs. 12 to 16, inclusive.

The latch coil 64 of the relay COR may also be energized to open the contacts 94 and drop out the contactor TC by opening the control switch 124 and holding the master controller D in its "coasting" position. During operation of the LC contactor to disable the dynamic braking circuit of any defective unit, the bad order lamp 134 of that unit remains energized. The necessity for energizing LC by means of the reset button 140 arises from the fact that the contactor B failed to drop out and thereby maintained the dynamic braking circuits. As has been previously described, the lamp 134 remains energized whenever the contactor B fails to drop out in proper sequence.

Battery protection

The deceleration of a vehicle provided with a control system according to our invention depends primarily upon electric braking. Consequently, it is essential to completely safeguard the battery, since that is a source of energy for the electrical devices by means of which dynamic braking circuits are established. To provide such protection a load limiting resistor L is connected between the battery V and all multiple unit control devices. Two parallel circuits are energized from the battery V. The local circuit control wire BB+ is energized by the battery through the contact 76 of contactor CC. The multiple unit control wire B+ is permanently connected to the positive side of the battery through the load-limiting resistor L. The resistance of the resistor L is so selected that in the event of a short circuit at any place in the multiple unit control circuit the short circuit current will be limited to a value slightly less than the normal charging current of the battery. This prevents a complete discharge of the battery through the multiple unit circuit in the event that this circuit is grounded.

Discharge of the battery through the local circuits is prevented by a ground resistor 184 and new and improved interlock forming part of our invention. Referring to the drawings it will be observed that a trip coil 185 of the contactor CC is connected to be energized through the control wire 14 and a cam switch 79. A cam 79a is provided on the control drum D in such a position that the cam switch 79 must be closed before the controller can be placed in its "non-operative" position. Therefore, whenever the master controller is placed in its "non-operative" position the contactor CC is necessarily tripped out due to the energization of the control wire 14. In dropping out the control contactor CC opens its contacts 76 to disconnect and disable all local control circuits connected to the control wire BB.

A ground resistor 184 is inserted between the negative wire B— and ground. If the battery wire B— were connected directly to ground, any voltage developed on the grounded track rails would appear on wire B—. Some voltage is always present on the track due to the IR drop along the rail for the length of the train. The resistor 184 is therefore inserted to protect the local control circuits from such voltage. The ground resistor 184 serves still another purpose in limiting the short circuit current arising from the accidental grounding of any local control circuit. In this latter connection the resistor 184 protects the local control circuits in a manner similar to that in which the resistor L protects the multiple-unit control circuits.

*Over-speed and overload protection*

Figure 11:
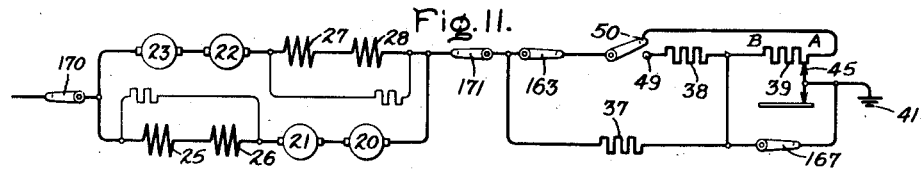

A further protective arrangement which we have included in our control system comprises a speed relay SR by means of which the motor field circuits are unshunted whenever in normal operation the vehicle exceeds a predetermined speed. The normal running connection of the motors 20, 21, 22, and 23 is shown in Fig. 11. In this connection the speed of the motors is high due to the fact that the series fields are shunted. The speed relay SR is provided with a contact 155 in series with the energizing circuits for the operating coils of the field switches FS1, FS2, FS3, and FS4. When the vehicle reaches a certain predetermined speed the relay SR operates to open the contact 155 and deenergize the operating coils of the field switches. Three operating coils are provided for the relay SR. The relay has a series coil 186 in series with the motor circuit and a shunt coil 187 connected across motors 20 and 21. Coils 186 and 187 act in opposition to each other, the coil 186 tending to maintain the contacts closed. Series coil 186 is assisted by a holding coil 188 which is deenergized when the contact 155 of the relay SR is opened. In operation the motor current decreases as the motor speed increases. The relay SR is so adjusted that when a predetermined speed is reached the combined influence of the coils 186 and 188 is no longer able to maintain the relay contacts closed. Relay SR therefore opens its contacts under the influence of the coil 187. When the contacts of the relay SR are opened, the holding coil 188 is deenergized to diminish the forces tending to close the relay contacts. This has the effect of preventing pumping of the relay when the motor current increases sufficiently to enable the series coil 186 to again close the contact 155.

Overload protection is provided by an overload relay OLR having a series trip coil 189 and a reset coil 190. When the relay OLR operates under the influence of its coil 189 it opens its contact 147 to break the energizing circuit of the coil 144 of LB1, and also closes its contact 191 to establish a resetting circuit for itself through its coil 190.

While we have shown a particular embodiment of our invention, it will be understood that we do not wish to be limited thereto since many modifications may be made. For example, although our invention has been shown applied to a three unit articulated vehicle, it will be obvious that it has broad application to any situation where speed motors driving a common load are to be controlled from any one of a plurality of selectable control stations. We therefore contemplate by the appended claims to cover any such modifications as fall within the true spirit and scope of our invention.

What we claim as new and desire to secure by Letters Patent of the United States, is:

1. In a control system for a plurality of connected driving units each of which is provided with a traction motor and motor controlling resistances for connection in circuit with said motors, a motor controlling system for each driving unit comprising a plurality of interconnected movable elements, a main controller associated with each of said control systems, connections between said control systems whereby a single selected main controller may operate all of said systems simultaneously, and interlocking means selectively connecting any one of said main controllers to said interconnected control systems.

2. In a multiple unit system of traction vehicles, a plurality of vehicles each of which is provided with a traction motor and a control system for said motor, a main controller for each motor control system, selector means associated with each controller, connections between said motor control systems, and circuit closing means energized through said connections and said selector means for selectively connecting any controller to each of said control systems.

3. In a control system for a plurality of connected driving units each having a traction motor and motor controlling resistances for connection in circuit with said motors, the combination of a plurality of similarly connected interconnected control systems, a main controller associated with each of said control systems, separate circuit closing means for connecting each of said main controllers with all control systems, and means providing for selective operation of any one of said circuit closing means, whereby all of said traction motors are simultaneously responsive to a selected one of said main controllers.

4. In a control system for a plurality of connected driving units each having a motor and motor controlling resistances for connection in circuit with said motors, the combination of a plurality of interconnected control systems, a manually operated controller associated with each of said control systems, and means for selectively connecting any controller to said interconnected control systems for the simultaneous control of the connections between said motors and their associated resistances.

5. The combination of a plurality of electric traction motors located at spaced points on a multiple unit vehicle, starting and braking resistors associated with each of said traction motors, field reversing switches associated with each of said motors, manually operated selector switches associated with each of said field reversing switches, a motor controlling system for each of said motors including a plurality of circuit closing means, a main control device in each of said systems having an operating coil connected to be energized through said selector switches, and control means interconnecting said selector switches.

6. The combination of a plurality of electric traction motors located at spaced points on a multiple unit vehicle, starting and braking resistors associated with each of said traction motors, field reversing switches associated with each of said motors, manually operable selector switches associated with each of said field reversing switches, a motor controlling system for each of said motors including a plurality of relays, a main control device in each of said systems having an operating coil connected to be energized through said selector switches, movable control means interconnecting said selector switches, and connections between said movable control means and said reversing switches for disabling all of said main control devices except when all of said field reversing switches are in position to connect said motors for operation of said vehicle in the same direction.

7. In combination, a plurality of electric traction motors located at spaced points on a multiple unit vehicle, starting and braking resistors associated with each of said traction motors, a motor controlling system comprising sequentially operating elements associated with each driving vehicle for controlling the traction motors on that vehicle, each such system including control means movable partially to energize said systems and manually operable selector means for controlling the direction of operation of said motors, connections between said selector means selectively to energize said control means, and means operable in conjunction with said selector means to disable all said control means upon operation of more than one of said selector means.

8. In combination, a plurality of electric traction motors located at spaced points on a multiple unit vehicle, starting and braking resistors associated with each of said traction motors, a motor controlling system comprising sequentially operating elements associated with each driving vehicle for controlling the traction motors on that vehicle, each said system including control means movable partially to energize said system and manually operable selector means, a connecting relay having contacts arranged to interconnect said selector means and selectively to energize said control means, and means for disabling all of said control means in response to the operation of more than one of said selector means.

9. In combination, a plurality of electric traction motors located at spaced points on a multiple unit vehicle, starting and braking resistors associated with each of said traction motors, circuit closing means for connecting said motors to a source of electric energy, a selector switch associated with each of said motors, a motor controlling system comprising sequentially operating elements associated with each driving vehicle for controlling the traction motors on that vehicle, each such system including control means movable to complete an operating circuit for all of said circuit closing means, a connecting relay having contacts arranged to complete a connection between said selector switches and selectively to energize said control means, and means associated with said selector switches for disabling said control means if more than one of said selector switches are operated.

10. In combination, a plurality of electric traction motors located at spaced points on a multiple unit vehicle, starting and braking resistors associated with each of said traction motors, circuit closing means for connecting said motors to a source of electric energy, an automatically operable reversing switch associated with each of said motors, a motor controlling system comprising sequentially operating elements associated with each driving vehicle for controlling the traction motors on that vehicle, each such system including control means movable to complete an operating circuit for all said circuit closing means, a connecting relay on each vehicle energized through the reversing switch on that vehicle and having contacts through which said control means may be energized, and means for selectively energizing said control means.

11. In combination, a plurality of electric traction motors located at spaced points on a multiple unit vehicle, starting and braking resistors associated with each of said traction motors, a motor control system comprising sequentially operating elements associated with each driving vehicle for controlling the traction motors on that vehicle, each of such systems comprising a control relay movable partially to energize said systems, a manually operable selector switch associated with each control system, an electromagnetic reversing switch operatively associated with each selector switch, a connecting relay on each vehicle energized through the reversing switch on that vehicle and having contacts arranged to complete connections between said selector switches, and means including said connections for selectively energizing any one of said control relays.

12. In combination, a plurality of electric traction motors located at spaced points on a multiple unit vehicle, starting and braking resistors associated with each of said traction motors, circuit closing means for connecting said motors to a source of electric energy, an electromagnetic reversing switch associated with each of said motors, a motor controlling system comprising sequentially operating elements associated with each driving vehicle for controlling the traction motors on that vehicle, each of said systems including control means movable to complete an operating circuit for all such circuit closing means, a manually operable selector switch on each unit arranged to control said reversing switches, a connecting relay on each unit having contacts arranged to interconnect said selector switches, contact means associated with each reversing switch for energizing the connecting relay on the same unit when said reversing switches are positioned for operation of their associated motors in a selected direction, and contact means associated with all said selector switches for selectively energizing said control means at a selected control station only by operation of only that selector switch at said control stations.

13. In an electric power supply system, a battery, a charging circuit for said battery including a source of electric current adapted to supply a predetermined charging current to the battery, a plurality of load circuits supplied from said battery, switching means for disconnecting all except one of said load circuits from said battery, and a resistor permanently connected in series with said one load circuit, said resistor being of such value as to limit the current therethrough when said resistor is connected directly across said battery to such a value that no detrimental decrease results in the voltage of said battery, whereby said other load circuits are protected against loss of supply voltage by the short circuiting of said one load circuit.

14. In an electric power supply system, a battery, a charging circuit for said battery including a source of electric current adapted to supply a predetermined charging current to the battery, a plurality of load circuits supplied from said battery, circuit making and breaking means for connecting one of said load circuits to said battery, and a resistor in series with one of said load circuits, said resistor being of such value as to limit the current therethrough when said resistor is connected directly across said battery to a value substantially the same as the normal charging current of said battery; whereby said other load circuits are protected against loss of supply voltage.

15. In an electric power supply system for the control circuits of a vehicle having an electric driving motor, electric control means for said motor including a plurality of electric circuits, electrically energized brake means for said vehicle, a battery connected to supply current to said control means and to said brake means, and a current limiting resistor connected between said battery and said control means, whereby said brake means are protected against loss of current supply if said control means is short circuited.

16. In an electric power supply system for the control circuits of a multiple-unit vehicle having an electric driving motor on each unit, a multiple unit control circuit for said motors on each unit, a common current supply wire for said circuits, a local motor control circuit on each unit, electrically energized brake means on each unit, a battery on each unit connected to supply current to said common current supply wire, to said local motor control circuit and to said brake means on the same unit, and a current limiting resistor connected between each of said batteries and said common current supply wire.

17. In a control system for a multiple-unit electrically driven vehicle having an electric motor on each unit, a local source of electric energy on each unit, interconnected control circuits for said motors connected to each such source of electric energy, a local control circuit for each motor, a manually operated controller on each unit having a non-operative position, means for connecting said local control circuits to said local sources of electric energy respectively, and means responsive to movement of the controller on any selected unit to its non-operative position to disconnect said local control circuit from the local sources of electric energy.

18. In a control system for a multiple-unit electrically driven vehicle having an electric motor on each unit, a source of electric energy on each unit, interconnected control circuits for said motors connected to each such source of electric energy, a local control circuit for each motor, a manually operated controller on each unit having a non-operative position, a relay on each unit energized through the controller on any selected unit and having contacts for connecting the local control circuit to its corresponding local source of electric energy, and means whereby the manually operated controller on said selected unit may be placed in its nonoperative position only after the controller has deenergized said relays to disconnect said local control circuits from said local sources of electric energy, said interconnected control circuits remaining connected to said sources of electric energy.

19. In combination, a plurality of spaced electric motors mechanically connected to a common load, movable reversing means associated with each of said motors for connecting all said motors to drive said load in a selected direction, indicating means associated with each of said motors for indicating improper motor connections, and means responsive to the position of each of said movable reversing means for operating the associated indicating means.

20. In combination, a plurality of spaced electric motors having series fields and connected to a common load, movable current reversing means for each of said series fields, electric indicating means associated with each of said motors, and circuit closing means responsive to the position of each reversing means for energizing the associated indicating means when any reversing means is improperly positioned for rotation of all of said motors in a selected direction.

21. In a multiple-unit electrically driven vehicle having an electric motor located on each of a plurality of said units and field circuits for said motors, a system for indicating improper motor connections comprising, a reversing switch for each of said field circuits, a line circuit breaker for each of said motors having normally closed auxiliary contacts, a relay associated with each motor and connected for energization through the associated reversing switch when said reversing switch is in proper position, said relay having contacts closed in the deenergized position of said relay, and an indicating relay on each unit connected for energization through said contacts and said auxiliary contacts.

22. In combination, an electric motor, a dynamic braking circuit for the motor including switching means, indicating means associated with said motor, and movable means controlled by said switching means for disabling said indicating means when said switching means is operated to open dynamic braking circuit.

23. In a dynamic braking system for an electric vehicle having control means for regulating a normal accelerating and braking sequence of the vehicle, an electric motor, a braking resistor for said motor, switching means for connecting said motor and resistor in a closed series circuit, operating means for said switching means, a source of electric energy normally connected to energize said operating means, latching means movable to disable said operating means, and tripping means operable during the normal accelerating sequence to restore said operating means.

24. In a dynamic braking system for an electric vehicle, an electric motor, a braking resistor for said motor, switching means for connecting said motor and resistor in a closed series circuit, operating means for said switching means, a source of electric energy normally connected to said operating means, a latching relay having contacts adapted to disconnect said operating means from said source of electric energy, said latching relay having a latching coil and associated armature for opening said contacts, and a trip coil for releasing said armature.

25. In a dynamic braking system for an electric vehicle having control means for regulating a normal accelerating and braking sequence of the vehicle, an electric motor, a braking resistor for said motor, switching means for completing a circuit between said motor and said resistor, operating means for said switching means, a source of electric energy normally connected to said operating means, a latching relay having contacts adapted to disconnect said operating means from said source of electric energy, said latching relay having a latching coil and associated armature movable to a predetermined position upon energization of said coil to open said contacts, a latch for holding said armature in said position, and a trip coil for operating said latch to release said armature energized during the normal accelerating sequence of the motor to release said armature, and a switch for energizing said latching coil.

26. In a traction system for a multiple unit vehicle, an electric motor on each of a plurality of units, separate dynamic braking circuits for the motors, each such circuit including switching means, separate operating means for said switching means, separate sources of electric energy normally connected to energize said operating means, and means for simultaneously disabling said operating means on all units upon which a dynamic braking circuit is established.

27. In a dynamic braking system for a multiple unit electric vehicle, a dynamic braking circuit associated with each unit including switching means, disabling means for each said circuit, control means for simultaneously operating said switching means to break said braking circuits, and a circuit energizable from a station on any selected unit to operate the disabling means on all units upon which the switching means has failed to operate.

28. In a dynamic braking system for multiple-unit electrical vehicle having control means for regulating a normal accelerating and braking sequence of the vehicle, a dynamic braking circuit associated with each unit including switching means, disabling means for each said circuit, operating means for each disabling means, a separate source of electric energy connected to each operating means, a latching relay associated with each operating means having contacts adapted to disconnect the operating means from said source of electric energy, each said latching relay having a latching coil and associated armature movable to a predetermined position upon energization of said coil to open said contacts, and a trip coil for operating said latch to release said armature energized during the normal accelerating sequence of the motor to release said armature, and a circuit controllable from a station on any selected unit to energize the latch coils on all units upon which the switching means has failed to operate.

29. In an electrically driven vehicle, an electric motor, connections for supplying energy, means for connecting said motor to said connection, second connection for supplying electric energy, control means for said motor energized from said second connection, and a resistor connected between said first and second connections, said resistor having a resistance sufficient substantially to preclude the impression upon said second connection of voltages appearing upon said first connection.

30. In an electrically driven vehicle, an electric motor having connections adapted to receive energy from a source of electric energy, second connections adapted to receive energy from a second source of electric energy, control means for said motor energized through said second connections, and a resistor connected between those of said first and second connections which are adapted for connection to like polarities of their respective sources of electric energy.

31. In a control system for an electric vehicle having a direct current driving motor and a field circuit for said motor, means for shunting the field circuit, and an impedance type relay for disabling the shunting means, said relay having an operating coil responsive to motor voltage and a restraining coil responsive to motor current.

32. In a control system for an electric vehicle having a direct current driving motor and a field circuit for said motor, means for shunting the field circuit, and an impedance type relay for disabling the shunting means, said relay having a holding coil tending to operate the relay and means for deenergizing the holding coil when the relay is operated.

33. In a control system for an electrically-driven vehicle, a driving motor having a field exciting winding, an accelerating resistor for said motor, means for connecting said motor and said resistor in circuit with a source of electric current supply thereby to drive said vehicle, means for gradually reducing the resistance of said resistor to accelerate said vehicle, means for shunting said field exciting winding thereby further to accelerate said vehicle, and means responsive to motor voltage for disabling said shunting means.

34. In a control system for an electrically-driven vehicle, a driving motor having a field exciting winding, an accelerating resistor for said motor, means for connecting said motor and said resistor in circuit with a source of electric current supply thereby to drive said vehicle, means for gradually reducing the resistance of said resistor to accelerate said vehicle, means for shunting said field exciting winding thereby to increase the speed of said vehicle, and means responsive to motor current and voltage for controlling said shunting means.

35. In a control system for an electrically-driven vehicle, a driving motor having a field exciting winding, an accelerating resistor for said motor, means for connecting said motor and said resistor in circuit with a source of electric current supply thereby to drive said vehicle, means for gradually reducing the resistance of said resistor to accelerate said vehicle, means for shunting said field exciting winding thereby to increase the speed of said vehicle, operating means responsive to motor voltage for disabling said shunting means, and means responsive to motor current for opposing said operating means.

36. In a motor control system for a multiple-unit vehicle having a plurality of driving units, a traction motor on each of said driving units, a source of power for said traction motors, switching means for connecting said motors to said source of power, additional switching means for establishing dynamic braking connections for said motors, control means associated with said switching means on each of said driving units, and a controller arranged to interconnect said control means for simultaneous actuation, said controller having braking, coasting, and accelerating positions simultaneously to control said motors and having a non-operative position in which the interconnection of said control means is disabled.

37. In a multiple-unit system of traction vehicles, the combination of a plurality of vehicles each of which is provided with an electric traction motor, a source of electric power supply for said motors, switching means on each of said vehicles for connecting said motors to said source of power supply, additional switching means on each of said vehicles for establishing dynamic braking connections for said motors, control means on each of said vehicles for actuating said switching means, and a manually operable motor controller having a plurality of operative positions in which said control means are interconnected by said controller for simultaneous accelerating and braking operation of said motors and having a non-operative position in which the interconnection with said control means is disabled, said controller, when in said operative positions, being actuable from a braking position through a coasting to an accelerating position to accelerate said motor and from said accelerating position through said coasting to said braking position to decelerate said motor.

38. In a multiple-unit system of traction vehicles, a plurality of vehicles each of which is provided with a traction motor and a control system for said motor, each of said control systems comprising a plurality of multiple-unit control circuits and a plurality of local control circuits, a local source of power on each of said vehicles, and a manually operable controller on one of said vehicles arranged to connect said multiple control circuits to one of said power sources and to connect said local control circuits to the local power source on the same vehicle, said controller being operable from a braking position through a coasting to an accelerating position to accelerate said motors and from said accelerating position through said coasting to said braking position to decelerate said motors and being also provided with a trip position and a non-operative position beyond said braking position, said controller when in said trip position disconnecting said local control circuits from said local power sources on each of said vehicles and when in said non-operative position disconnecting said multiple control circuits from said one power source.

JACOB W. McNAIRY.
HAROLD G. MOORE.